United States Patent [19]

Cronin et al.

[11] 4,300,028
[45] Nov. 10, 1981

[54] ROTARY SWITCH FOR GAS-INSULATED SUBSTATIONS

[75] Inventors: John C. Cronin, Limerick, Ireland; Walter M. Wilson, Greensburg, Pa.

[73] Assignee: Gould Inc., Rolling Meadows, Ill.

[21] Appl. No.: 78,801

[22] Filed: Sep. 25, 1979

[51] Int. Cl.³ .............................................. H01H 19/28
[52] U.S. Cl. ............................. 200/155 R; 200/11 B; 200/273; 200/275
[58] Field of Search ............... 200/155, 273, 275, 286, 200/289, 149 A, 149 R, 11 R, 11 B, 144 B, 144 A

[56] References Cited

U.S. PATENT DOCUMENTS

| 2,513,953 | 7/1950 | Minneci | 200/11 B |
| 2,751,447 | 6/1956 | Bartlett et al. | 200/11 B |
| 2,918,541 | 12/1959 | Waite | 200/11 B |
| 3,536,865 | 10/1970 | Meyer | 200/273 |

*Primary Examiner*—Willis Little
*Attorney, Agent, or Firm*—Ostrolenk, Faber, Gerb & Soffen

[57] ABSTRACT

A rotary selector switch comprises a generally flat blade mounted for rotation in its own plane about an axis passing through it into and out of contact with one or more of several spaced terminal contacts.

6 Claims, 8 Drawing Figures

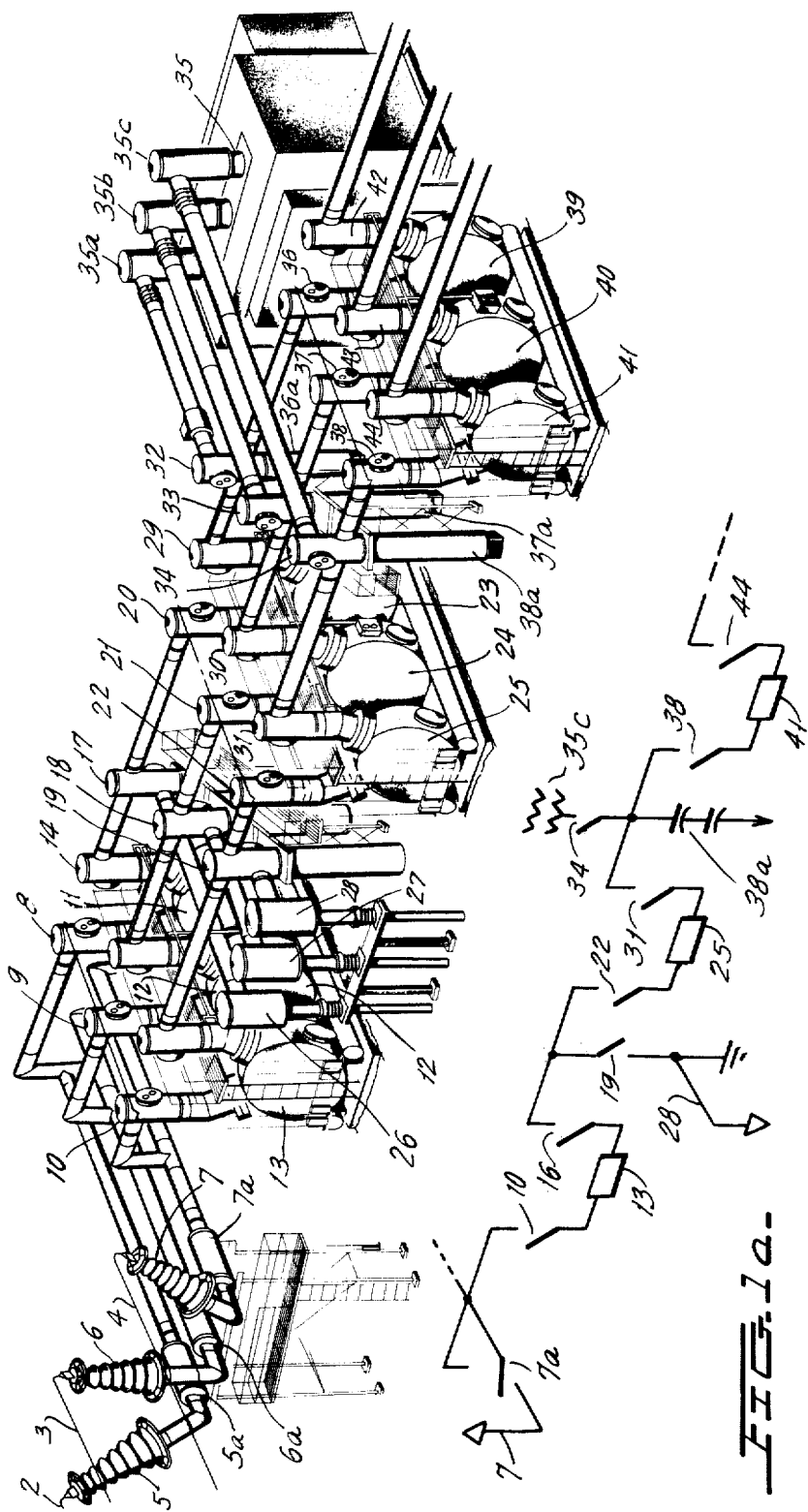

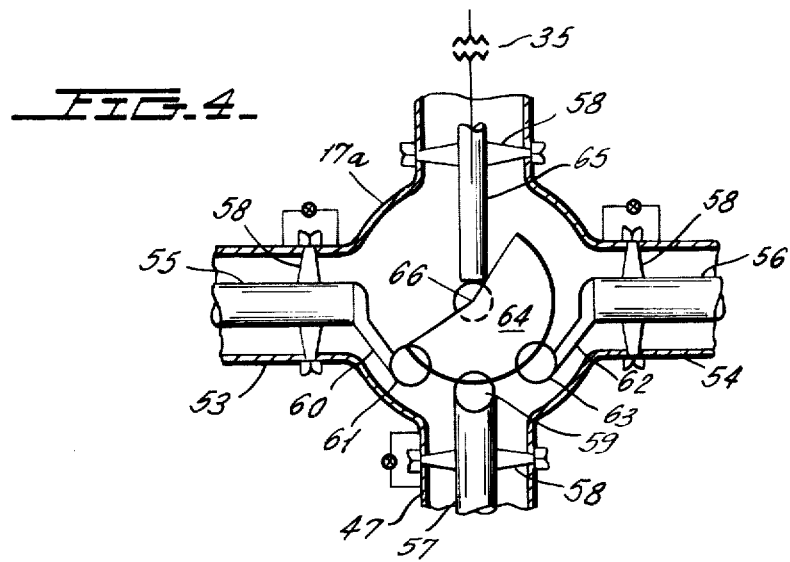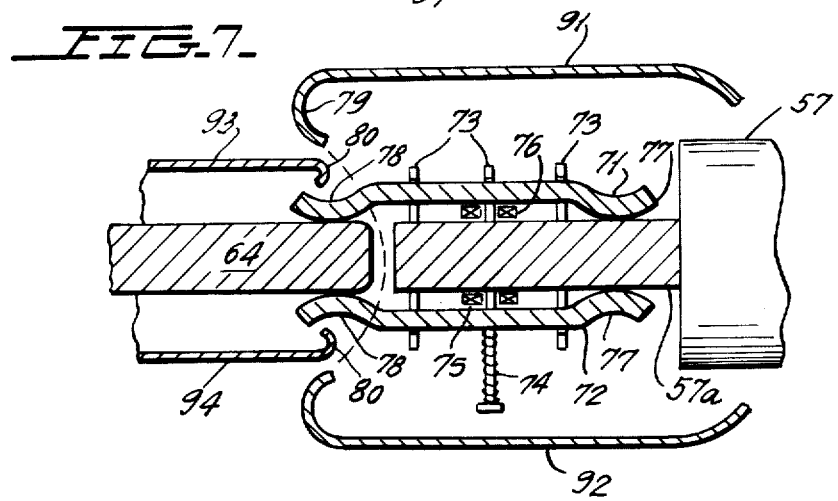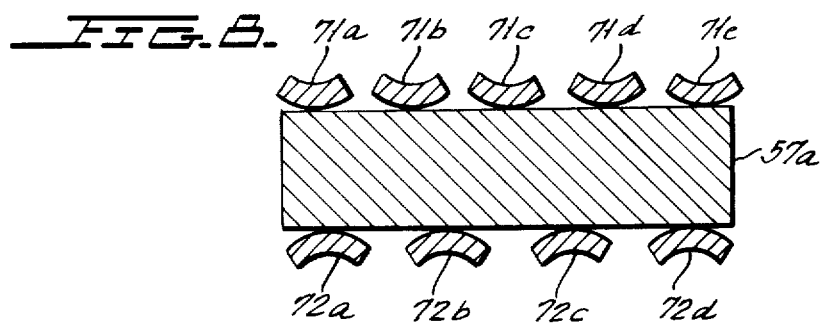

4,300,028

1

ROTARY SWITCH FOR GAS-INSULATED SUBSTATIONS

BACKGROUND OF THE INVENTION

This invention relates to gas-insulated substations and more specifically relates to a novel rotary switch for gas-insulated substations.

In gas-insulated substations a variety of switching functions must be performed and, consequently, a variety of disconnect switch types have evolved. These would include, for example, horizontal switches, breaker switches, tap switches, ground switches and the like. Each of these switches is now made as a separate unitary device and several distinct switch devices are interconnected in any given substation assembly. Each of the distinct switch devices is relatively expensive and requires separate engineering drawings. In addition, each unitary switch takes up space, and limits the substation compactness that can be achieved, particularly at lower voltages. The individual switches must also be provided with respective controls and, frequently, with motor operators, gas monitoring systems, and the like.

SUMMARY OF THE INVENTION

The principal object of the present invention is to provide a novel selector switch that can fulfill the functions of at least two separate conventional switches in a gas-insulated substation, to permit greater economy and compactness.

It is another object to provide a single switch assembly that can replace several types of switches in the conventional substation so as to reduce such costs as tooling, engineering, and documentation required in the manufacture of a plurality of different assemblies.

It is a further object to provide a novel switch that permits use of a simpler control scheme, motor operators, etc., resulting in greater economy.

To satisfy these objects, the present invention provides a rotary switch for a gas-insulated substation that can, for example, serve the functions performed conventionally by two breaker switches and a tap switch. In one preferred embodiment, the switch of the invention comprises a conductive blade having the form of a disc from which an angular section has been removed. It is mounted so that it can rotate about the axis of the disc. Three terminals are disposed relatively close together angularly about a portion of the disc's circumference. Each terminal is shaped to accommodate the blade between two sets of contact fingers while permitting it to rotate fairly freely. By rotating the blade to the proper angular position, any one, any two or all three of the terminals can be contacted by the blade, the center of which may be in electrical contact with a fourth conductor if voltage indication is desired. All three poles can be housed in a single gas-filled tank, permitting considerable economy.

BRIEF DESCRIPTION OF THE DRAWINGS

In the figures, like elements are indicated by like reference numerals.

FIG. 1 shows a perspective view of a conventional gas-insulated substation of a type in which the selector switch of the invention could be advantageously utilized.

FIG. 1a is a line diagram of FIG. 1.

FIG. 4 is a sectional side view of a portion of a substation housing the rotary selector switch of the invention.

FIG. 7 is a partial cross-section view showing a terminal contact that could be used in the assembly shown in FIG. 4, engaged by a rotary switch blade.

FIG. 8 shows a sectional view of the contact fingers of FIG. 7 constituting a terminal contact in relation to the blade of the switch of the invention.

DETAILED DESCRIPTION OF THE INVENTION

Figure 3:
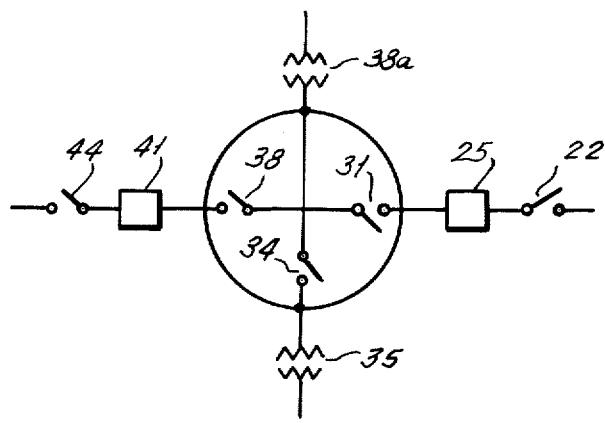
FIG. 3 is a schematic diagram showing the switching functions performed by the rotary switch of the invention.

FIG. 1 shows a typical conventional three-phase gas-insulated substation. A typical prior art gas-insulated substation is described, for example, in U.S. Pat. No. 4,130,850 dated Dec. 19, 1978. The three phase lines 2,3 and 4 enter the substation via air to-gas bushings 5,6 and 7 and horizontal disconnect switches 5a,6a and 7a. Each line passes through a respective first disconnect switch 8,9 and 10 and enters a first respective circuit breaker 11,12 and 13. Leaving the circuit breakers 11,12 and 13, through respective second disconnect switches 14,15 and 16 each phase contains a respective tap switch 17,18 and 19 and a respective third disconnect switch 20,21 and 22 leading to a respective second circuit breaker 23,24 and 25. Each of the three tap switches 17,18 and 19 permits connection to a respective pothead 26,27 and 28. Each of potheads 26,27 and 28 can receive test bushings. Each phase leaves the second breaker 23,24 and 25 via a fourth respective disconnect switch 29,30 and 31, traverses a double tap switch 32,33 and 34 connected to respective poles 35a,35b and 35c of a power transformer 35. Tap switches 32,33 and 34 are also connected to respective poles of coupling capacitor voltage transformers 36a,37a and 38a, respectively. Disconnect switches 29,30 and 31 are also connected to disconnect switches 36,37 and 38, respectively, of circuit breakers 39,40 and 41, respectively. Breakers 39,40 and 41 are lastly connected to disconnect switches 43,44 and 45, respectively.

For purposes of clarity, a line diagram of FIG. 1 is shown in FIG. 1a wherein the numerals of the pole containing line 4 have been used.

Either or both tap switches 17-19, 32-34 can be replaced by the novel rotary selector switch of the invention for each respective phase. As described below, the selector switch of the invention would replace not only a tap switch but the two disconnect switches adjacent it as well, resulting in considerable economy of space and of maintenance costs.

Figure 2:
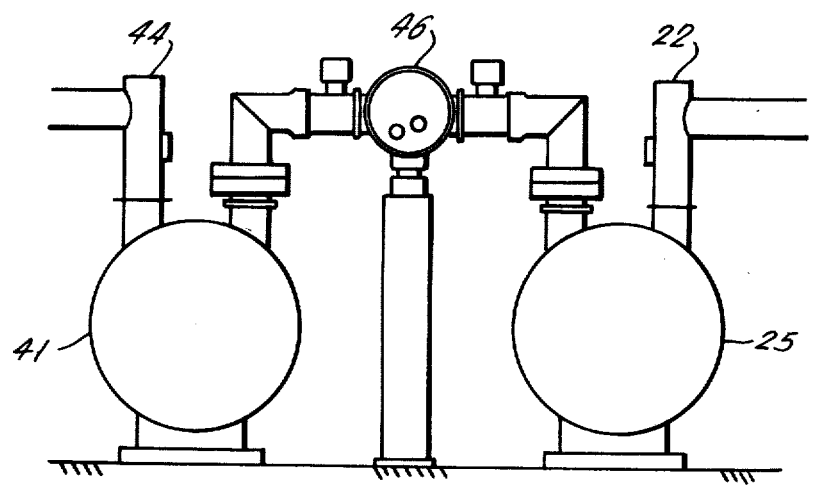
FIG. 2 shows an elevation view of a substation section employing the rotary switch of the present invention.

FIG. 2 shows a view of a portion of one pole of a substation like that of FIG. 1, employing the novel rotary selector switch of the invention. This switch, contained in schematically shown housing 46 performs the functions of tap switch 34 and of the adjacent disconnect switches 31 and 38 in the structure of FIGS. 1 and 1a. FIG. 3 shows schematically the switching functions of the rotary switch of the invention as employed in the single phase of the substation arrangement of FIG. 2.

Switches 31, 34 and 38 in FIGS. 2 and 3 can be opened in any desired combination to isolate breakers 25 and 41 from one another or to connect either of the lines to the transformer 35. Details of the novel unitary switch 46 are shown in the following Figures.

In FIG. 4, gas-filled bus housings 53, 54 and 45 contain conductors 55, 56 and 57, respectively supported in bus housings 53, 54 and 45 by conventional insulative supports 58. Conductor 57, mounted in housing 47, is provided at its upper end, which extends into switch housing 46, with a terminal contact 59. The end of conductor 55 extends into the interior of housing 46 and is provided with a conductive arm 60 that extends downward into housing 46 toward terminal contact 59, at an angle of generally 45° from the horizontal. The lower end of the arm 60 is provided with a second terminal contact 61. Bus conductor 56 has a corresponding arm 62 and terminal contact 63. Blade 64, having the form of a disc of a conductive material from which a pie slice has been removed, is mounted in housing 46 for rotation about its center and is in electrical contact with one end of a fourth bus conductor 65. The blade 64 is so located and fills an angle about its center of such size that, by rotating the blade about its central contact 66, it is possible to put the blade 64 into contact with any desired combination of contacts 59, 61, 63, or to remove it from contact with them altogether. Contacts 59, 61 and 63, correspond to contacts of switches 34, 31 and 38, respectively, in FIG. 3.

Figure 5:
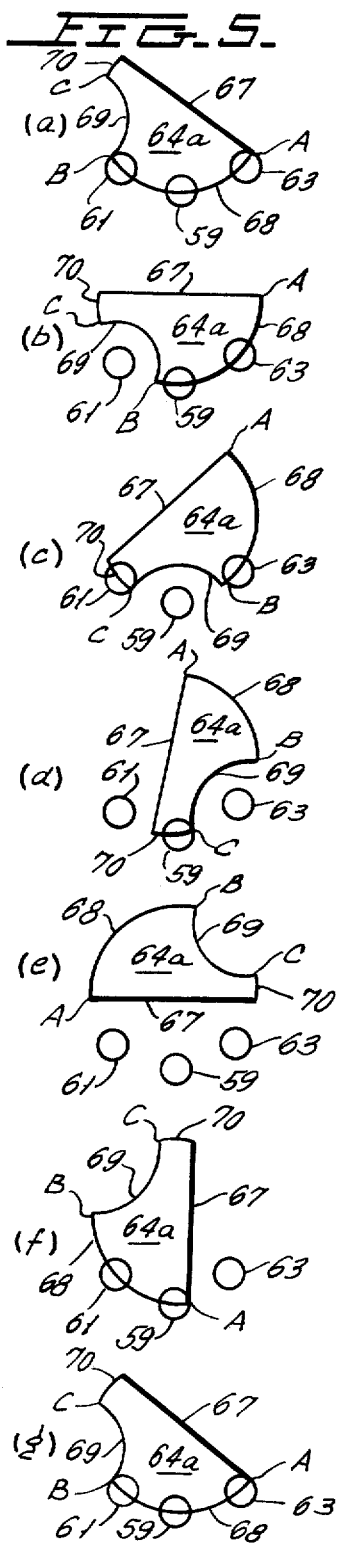
FIGS. 5a to 5g are schematic diagrams of another embodiment of the blade of the switch of the present invention connecting various combinations of the three terminals with which it is associated.

FIG. 5 shows a further embodiment of the blade 64a and the various positions into which it can be moved in order to connect any combination of contacts 59, 61, and 63. In this embodiment, the blade 64a has the form of a semicircle mounted for rotation about the midpoint 67 of its diameter, and having a section removed from the circular part of its circumference. The perimeter of blade 64a thus consists of: a straight diameter; a long arcuate portion 68 extending from one end A of the diameter of the blade 64a and subtending an angle of somewhat over 90°; an arcuate indentation 69, between points B and C in FIG. 5c, subtending most of the rest of the straight angle defined by the diameter of the blade 31a; and a short arcuate portion 70 from point C to the second end of the diameter. As can be seen from FIG. 5a, the long arcute part 68 of the perimeter of blade 64 is sufficiently long to permit it to be in complete electrical contact with all three terminal contacts 59, 61, and 63 simultaneously. The distance across the indentation 69, that is the distance between cusps B and C (see FIG. 5c), is small enough that blade 64a can be in complete electrical contact with both contacts 61 and 63 while the indentation 69 is located adjacent contact 59 so that contact 59 does not touch the blade 64a (see FIG. 5c).

Figure 6:
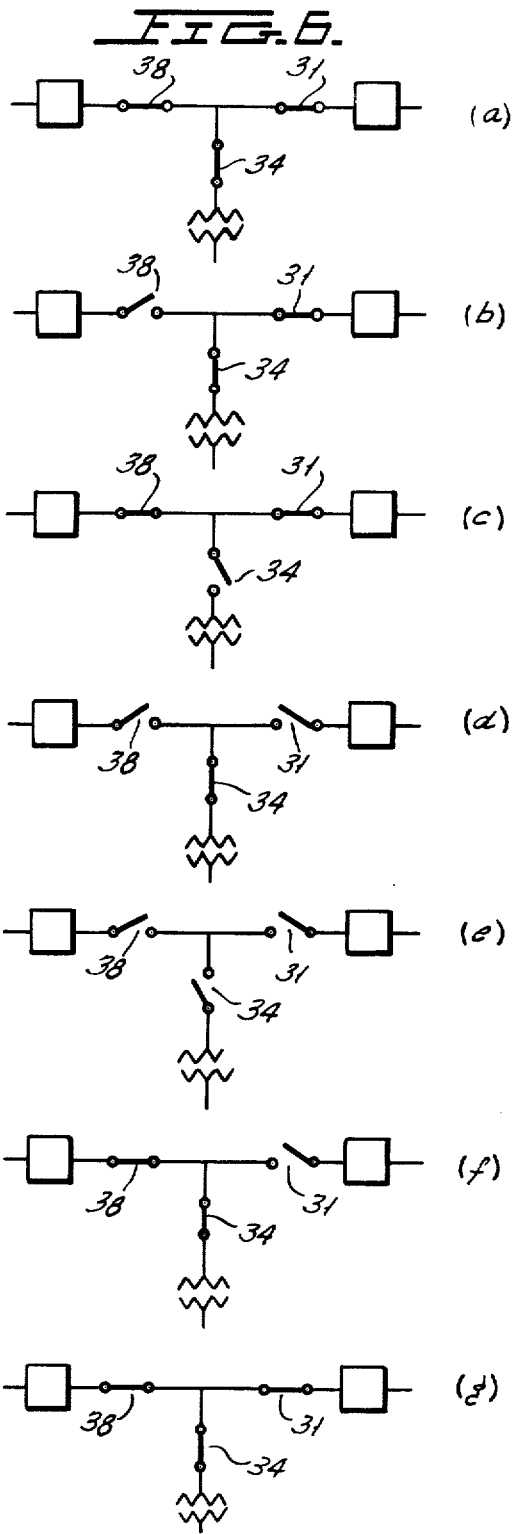
FIGS. 6a to 6g are schematic diagrams of two conventional breaker switches and a conventional tap switch showing various switching positions corresponding to the positions shown in FIG. 5.

In FIG. 5a, the blade 64a is shown with its longest arc 68 touching all three contacts 59, 61, 63. In FIG. 5b the blade 64a has been rotated counter-clockwise to align the indentation 69 with contact 61, so that only contacts 59 and 63 touch the blade 64a. In FIG. 5c, the blade 64a has been rotated further in the counter-clockwise direction so that the indentation 69 is aligned with contact 59 and the blade 64 touches contacts 61 and 63 only. In FIG. 5d, a further rotation has been made, aligning the indentation 69 with contact 63, so that only contact 59 touches the blade 64a. By a further small rotation in the counter-clockwise direction, it would be possible to make the smaller arc 70 of the blade 64a touch contact 63, leaving contacts 61 and 59 disconnected from the blade 64a. By yet a further rotation in the counter-clockwise direction, as shown in FIG. 5e, it is possible to move the blade 64a so that it does not touch any of the three contacts 59, 61, 63. By a further small rotation it would be possible to bring point A of the blade 64a into contact with terminal contact 61. Yet a further rotation, as shown in FIG. 5f, will bring the larger arc 68 of the blade 64a into contact with contacts 61 and 59. A further rotation in the same direction, shown in FIG. 5g, returns the blade 64a to its original position. The corresponding switch positions of a conventional substation arrangement are shown schematically in FIG. 6.

It is a central feature of the invention that the rotary selector switch, performing the functions of a plurality of conventional unitary switches, can be operated by a single control system (or by one motor operator), resulting in considerable economy.

It should be noted that, although the rotary selector switch of the invention does not have the coaxial geometry associated with conventional disconnect switches, the intrinsic dielectric strength of $SF_6$, if that gas is used for insulation, is so high that considerable non-uniformity in the electric field can be tolerated. A 145 kV unitary switch could be housed in a 22-inch diameter tank approximately 16 inches in length. The spherical corona shield on the switch jaws would be approximately 4 inches in diameter. In contrast, a conventional 145 kV disconnect switch requires a housing tank 16 inches in diameter and approximately 4 feet long. Furthermore, with the rotary switch of the invention, all three poles can be accommodated in one housing.

FIG. 7 shows in detail a typical contact which can be used in the rotary selector switch of the present invention. The blade 64 of the switch housed in housing 46 is shown at the left. At the right is the flattened end 57a of bus conductor 57. Contact finger 72 is disposed underneath and in contact with the bus conductor section 57a, and contact finger 71 is similarly disposed above and in contact with the bus conductor section 57a. These contacts are held in place by brackets 73, one of which is provided with a spring 74 to urge the lower contact finger 72 upwards against the bus conductor contact 57a and the blade 64. Because each bracket 73 is hooked over the top of upper contact finger 71, spring 74 also has the effect of urging upper contact finger 71 against the blade 64. Washers 75 and 76 are disposed between the contact fingers 71, 72 and the bus conductor 57. Each contact finger 71, 72 is provided with an arcuate section 77, 78 at each end. One arcuate section 77 of each contact finger 71, 72 makes high pressure electrical contact with the bus conductor section 57a, and the corresponding arcuate section 78 at the other end of the contacts 71, 72 makes the actual connection with the switch blade 64. The end of the bus 57 extends into housing 46 which covers the contacts. Annular corona shields 90 and 91 cover contacts 61, 59 and 63, and disc-shaped corona shields 93 and 94 cover the edges of contact 64 and next into shields 91 and 92. The shields 91 to 94 are supported in any desired manner.

FIG. 8 shows that a plurality of contacts 71e and 72a to 72d can be used in place of single contact fingers Although several preferred embodiments of the present invention have been described above in detail, many variations and modifications thereof will now be apparent to one skilled in the art. Accordingly, the scope of the present invention is to be limited not by the details of the above detailed description, but only by the terms of the appended claims.

What is claimed is:

1. A rotary selector switch comprising:
   a conductive housing filled with an insulative gas;
   a conductive blade contained in said housing and mounted therein for rotation about an axis, said blade having the general form of a portion of a disc;
   central contact means disposed at said axis and in electrical contact with said blade; and
   first, second and third terminal contact means disposed in said housing and adapted to engage an edge of said blade and disposed within said housing at positions angularly displaced apart from each other with respect to said axis about which said blade is rotatable, said blade being so shaped and so mounted as to be selectively rotatable to move into and out of mechanical and electrical contact with each combination of said first, second and third terminal contact means.

2. The switch of claim 1, wherein said first terminal contact means is in electrical contact with one end of a coaxial bus conductor.

3. The switch of claim 1, wherein said blade has the form of a fan-shaped portion of a disc.

4. The switch of claim 1, wherein said blade has a straight edge and first and second curved edges, said first curved edge being a portion of the circumference of said disc of which said blade is a portion and said second curved edge defining an arcuate recess in the perimeter of said blade, said first and second curved edges being adjacent.

5. The switch of claim 1, wherein said first terminal contact means comprises: a first contact finger disposed generally to one side of the plane of rotation of said blade and a second contact finger means disposed generally to the other side of said plane of rotation of said blade in generally face-to-face relation to said first contact finger means; means to space said first and second contact finger contact means apart from each other a minimum distance so that said blade can be moved into the space between them; and means for urging at least one of said finger contact means against said blade when said blade is accommodated therebetween.

6. The switch of claim 1, wherein said blade is constructed with certain sections of said portion of a disc being diametrically opposed to one another; said certain sections disposed along said edge of said blade and being selectively engageable with said first, second and third terminal contact means.

* * * * *